United States Patent [19]

Lewis

[11] 4,285,980
[45] Aug. 25, 1981

[54] METHOD FOR PREPARING MOLDED POULTRY PRODUCT

[76] Inventor: Reuben Lewis, 105-52 Flatlands 7th St., Brooklyn, N.Y. 11236

[21] Appl. No.: 155,148

[22] Filed: May 30, 1980

Related U.S. Application Data

[63] Continuation-in-part of Ser. No. 33,132, Apr. 25, 1979, abandoned, which is a continuation-in-part of Ser. No. 885,516, Mar. 13, 1978, abandoned.

[51] Int. Cl.³ .................. B65D 81/34; A23L 1/315
[52] U.S. Cl. ........................ 426/249; 426/412; 426/414; 426/92; 426/104; 426/513; 426/413
[58] Field of Search ............... 426/92, 104, 513, 414, 426/413, 140, 512, 272, 412, 644, 645, 646, 129, 515, 249; 249/55, 160, 163, 168, 92

[56] References Cited

U.S. PATENT DOCUMENTS

| 211,859 | 2/1879 | Manley | 426/113 |
|---|---|---|---|
| 1,486,476 | 3/1924 | Bloss | 426/282 |
| 1,813,969 | 7/1931 | Riha | 426/412 |
| 1,906,882 | 5/1933 | Perret | 249/55 |
| 1,956,239 | 4/1934 | Kunner | 426/646 |
| 2,037,892 | 4/1936 | Gleason | 426/513 |
| 2,166,568 | 7/1939 | Kuhlke | 426/414 |
| 2,368,398 | 1/1945 | Baker | 426/413 |
| 2,686,128 | 8/1954 | Conti | 426/414 |
| 2,779,681 | 1/1957 | Sell et al. | 426/412 |
| 2,853,389 | 9/1958 | Luchese | 426/140 |
| 2,916,381 | 12/1959 | Jumenko | 426/140 |
| 3,060,494 | 10/1962 | Noble | 426/513 |
| 3,166,427 | 1/1965 | Herrmann | 426/414 |
| 3,268,339 | 8/1966 | Torr | 426/644 |
| 3,285,749 | 11/1966 | Shires | 426/515 |
| 3,285,753 | 11/1966 | Schwall et al. | 426/272 |
| 3,393,890 | 7/1968 | Lemelson | 249/92 |
| 3,416,931 | 12/1968 | Pusegate | 426/644 |
| 3,511,669 | 5/1970 | Swartz et al. | 426/281 |
| 3,563,764 | 2/1971 | Posegate | 426/92 |
| 3,791,285 | 2/1974 | Mack | 426/113 |
| 3,809,774 | 5/1974 | Raitt | 426/515 |
| 3,911,154 | 10/1975 | Weatherspoon | 426/92 |

FOREIGN PATENT DOCUMENTS 908505 8/1972 Canada .................. 426/512

Primary Examiner—Steven L. Weinstein
Attorney, Agent, or Firm—Marvin Feldman; Stephen E. Feldman

[57] ABSTRACT

A process for preparing a molded poultry product using a mold device with the configuration of a cooked poultry comprises two sectional members each having an internal contour of a portion of the configuration whereby assembly of the sectional members forms an internal surface having the configuration of the whole cooked poultry. A flexible bag is provided within the assembled sectional members for assuming the shape of the internal surface when poultry meat is passed into the flexible bag.

6 Claims, 7 Drawing Figures

U.S. Patent  Aug. 25, 1981  Sheet 3 of 3  4,285,980
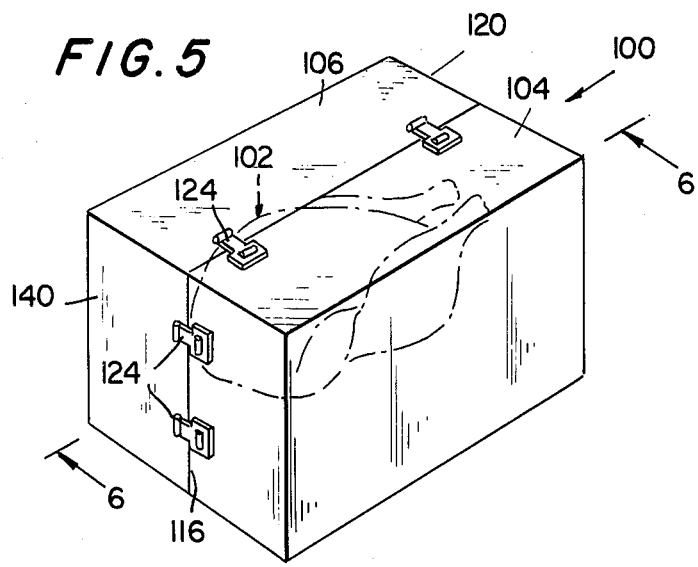
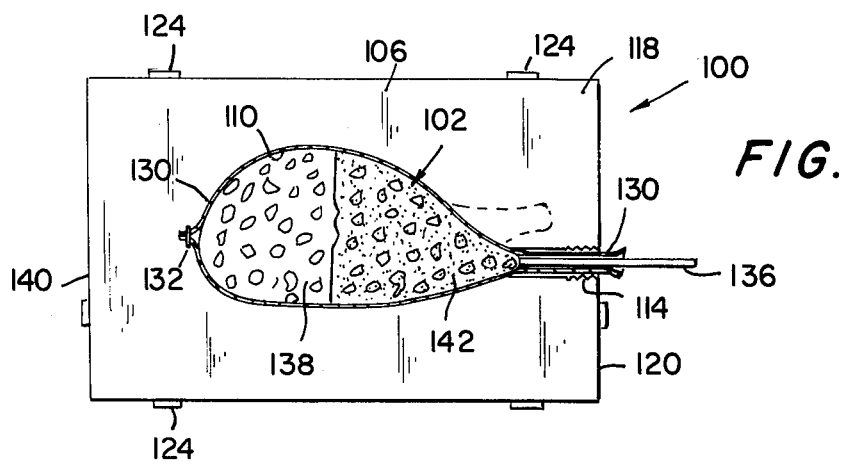
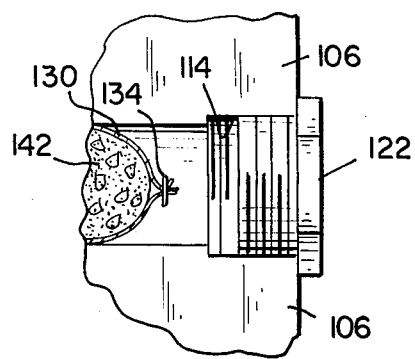

METHOD FOR PREPARING MOLDED POULTRY PRODUCT

CROSS REFERENCES TO RELATED APPLICATIONS

This application is a continuation in part of U.S. patent application Ser. No. 033,132 filed Apr. 25, 1979 which is a continuation-in-part of Ser. No. 885,516 to Reuben Lewis filed Mar. 13, 1978, both now abandoned.

BACKGROUND OF THE INVENTION

This invention relates to a food product and the method and apparatus for making same. More particularly this invention relates to a molded poultry product, and method of obtaining same from a raw foul in conjunction with the product mold.

Heretofore it was known to provide molded food products such as in Noble, U.S. Pat. No. 3,060,494, granted Oct. 30, 1962, wherein steak simulating material was molded into the appearance of a T-bone steak. And in Weatherspoon, U.S. Pat. No. 3,911,154, granted Oct. 7, 1975 there is also disclosed a method for preparing a natural appearing steak product.

Attempts have been made to prepare boneless poultry products having the shape of the fowl, such as disclosed in Luchese, U.S. Pat. No. 2,853,389, granted Sept. 23, 1958 and in the Jumenko patent, U.S. Pat. No. 2,916,381 granted Dec. 8, 1959. Luchese discloses a boneless stuffed fowl formed within the skin of the fowl, and Jumenko likewise debones, but in part only, and returns the meat to the skin but provides for separate white and dark meat portions. Jumenko does not use a poultry stuffing as in Luchese but does stuff with other meat products.

While such prior art products achieved limited results, it was found desirable to provide a poultry product which is truly skinless and boneless while having the self retaining shape of cooked poultry. It was also desirable in the prior art to provide a turkey product as aforesaid which is free of added foreign meat products or poultry stuffings.

Now there is provided by the present invention a poultry product having the self-retaining shape of cooked poultry and is boneless and skinless, and composed only of the poultry itself, without foreign meats or stuffings.

It is therefore a principal object of this invention to provide a skinless, boneless poultry product having the self-retaining shape of cooked poultry, and the method and apparatus for making same.

It is another object of this invention to provide the poultry product as aforesaid, wherein the need for added foreign meats or stuffings is precluded.

It is a further object of this invention to provide a poultry product as aforesaid wherein there are separate white and dark meat sections which conform to the white and dark meat sections of conventional cooked poultry.

It is another object of this invention to provide a poultry product as aforesaid which is ready-to-eat for the consumer.

It is still a further object of this invention to provide a poultry product as aforesaid wherein the product consists essentially of the natural poultry itself.

It is still a further object of this invention to provide a method for making the aforesaid poultry product which method utilizes essentially the entire poultry without waste.

It is still a further object of this invention to provide a mold for forming the poultry product of this invention wherein said mold permits the separate white and dark meat formations, while also permitting the cooked poultry contour.

SUMMARY OF THE INVENTION

A mold device for producing a poultry product with the configuration of a cooked poultry comprises two sectional members each having an internal contour of a portion of the configuration whereby assembly of the sectional members for an internal surface having the configuration of the whole cooked poultry. A flexible bag is provided within the assembled sectional members for assuming the shape of the internal surface when poultry meat is pressed into the flexible bag.

The invention also includes the method of producing a cooked poultry product in the form of a cooked poultry and includes the following steps: First, a flexible bag is placed into the internal surface formed within two sectional members. Then a portion of the flexible bag is filled with a first meat. Next, a second meat is pressed into the flexible bag against the first meat so that the bag assumes the shape of the internal surface.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 5 is a perspective view of the mold of the second embodiment;

FIG. 6 is a sectional view taken along 6—6 of FIG. 5; and

FIG. 7 is a fragmented view partially in cross-section taken along 6—6 of FIG. 5 after the bag is closed.

DESCRIPTION OF THE PREFERRED EMBODIMENT

Figure 1:
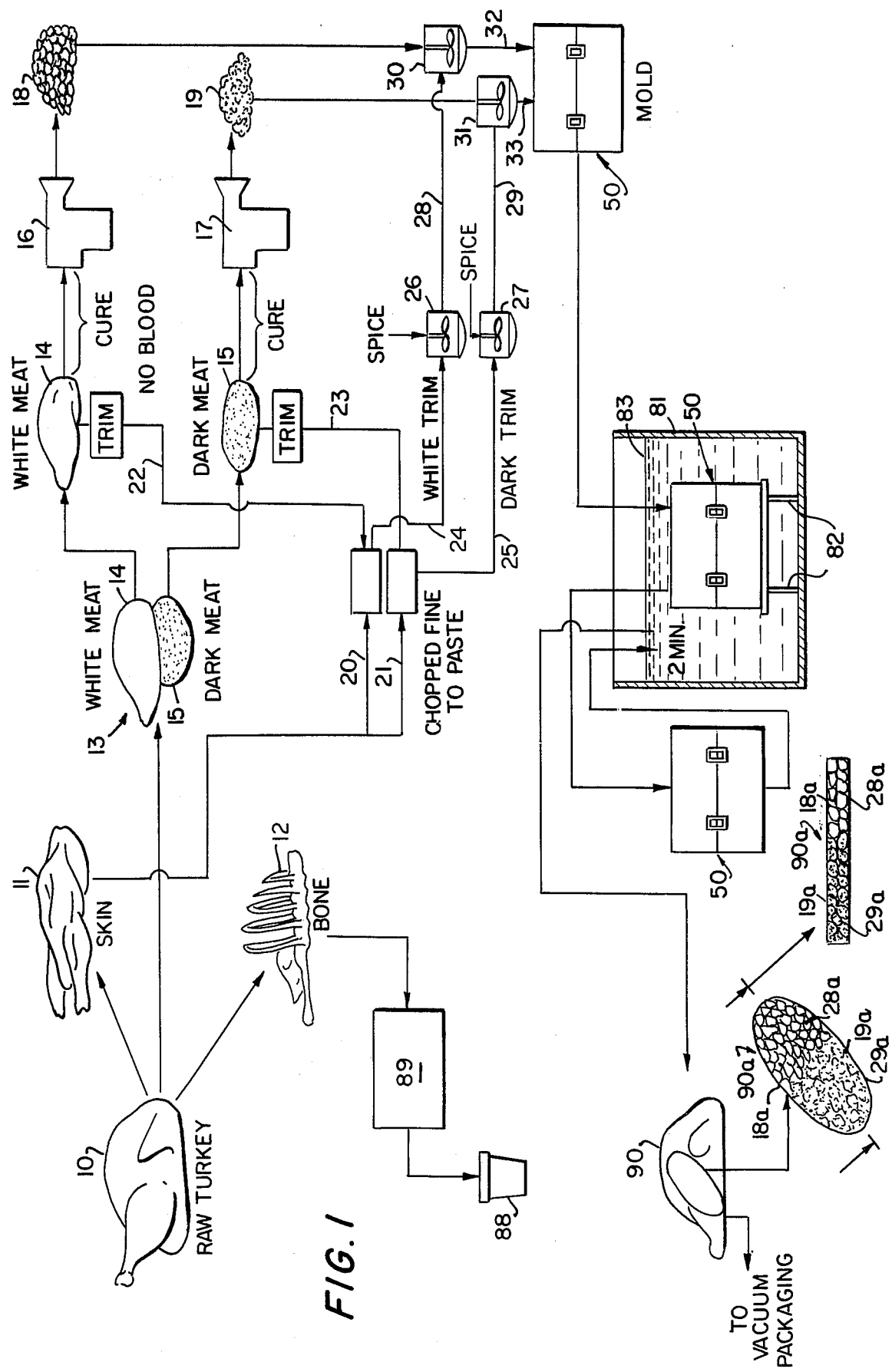
FIG. 1 is a schematic illustration of the method of making the poultry product and several views of the product itself.

Referring now to FIG. 1, there is shown a raw turkey 10 which is preferably fresh-killed. Turkey 10 is deboned and the skin removed, and the skin 11 and bones 12 are set aside for further processing, as will be more fully explained hereinafter. The turkey meat 13 is carefully separated into white meat 14 and dark meat 15, for separate subsequent processing.

Both the white meat 14 and the dark meat 15 are trimmed to remove fat, cartilage or veins adhering to the respective meat portions. The trimmed white and dark meat then undergoes separate but concurrent curing in a salt cure at about 40° F. for approximately one day. After curing, the white and dark meat portions are coarsely ground in grinders 16 and 17, respectively, to approximaely 1-inch cube pieces, 18 and 19, respectively. Suitable well-known commercial grinders may be employed.

While the meat portions are undergoing the aforesaid meat processing in preparation for molding, meat binders are being prepared to assist in holding the meat in the molded shape. Specifically, skin 11 is divided in weighted proportions 20 and 21, according to weighted proportion of white to dark meat. Skin portion 20 is combined with the trim material portion 22 and chopped fine by either manual or mechanical means to a paste 24, and skin portions 21 is combined with trim material portion 23 and similarly chopped to form a paste 25. Paste portions 24 and 25 are then transferred to mixers 26 and 27 respectively, whereat they are admixed with suitable spices, particularly the well-known poultry spices.

The spice mixtures 28 and 29 are then separately mixed with meat portions 18 and 19 in mixers 30 and 31, respectively to form mixed binder meat portions 32 and 33, respectively. Meat portions 32 and 33 are then pressed into mold 50 as will be more fully explained hereinafter.

Figure 2:
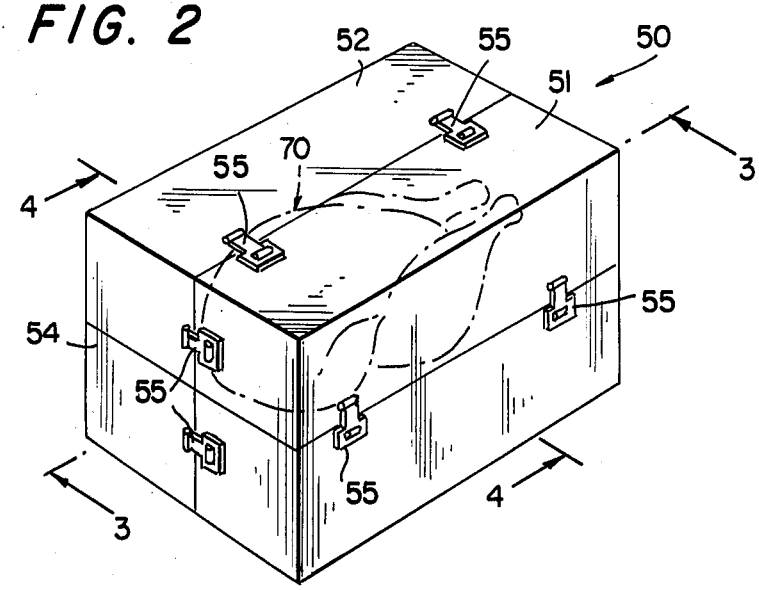
FIG. 2 is a perspective view of the mold for forming the product.
Figure 3:
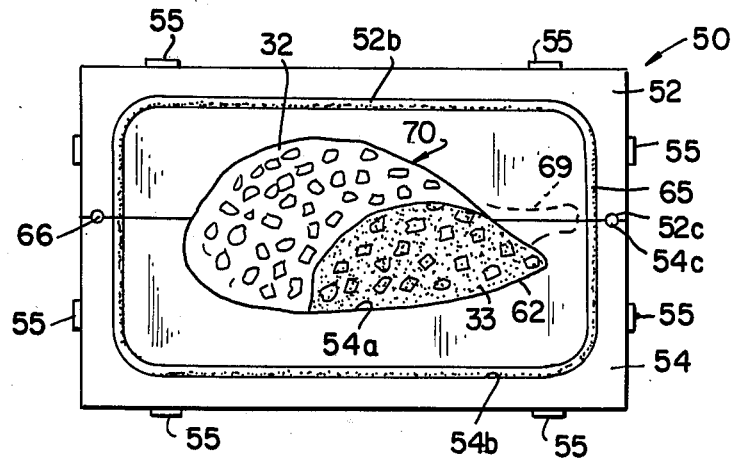
FIG. 3 is a sectional view taken along 3—3 of FIG. 2.
Figure 4:
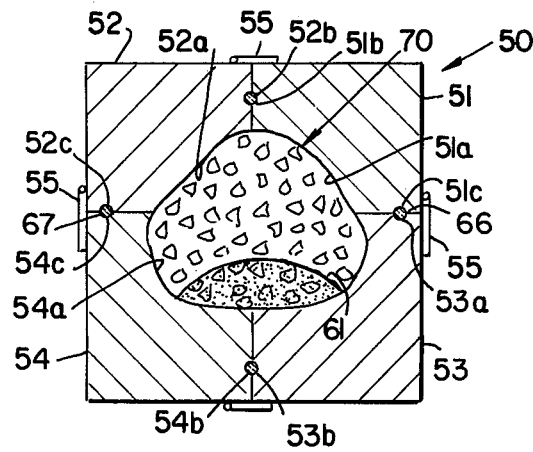
FIG. 4 is a sectional view taken along 4—4 of FIG. 2.

Referring now to FIGS. 2-4, there is shown mold 50 with the molded turkey product 70 therein. Mold 50 is of generally rectilinear overall configurations and comprises four sections, namely 51, 52, 53 and 54; said sections being held together by spring tension clamps 55 (typical). Each mold section 51, 52, 53 and 54 is formed with a contoured internal surface 51a, 52a, 53a and 54a, respectively so that when the sections are assembled, the said surfaces form a hollow portion having the configuration of a turkey. It is to be borne in mind that while the molded turkey product 70 has the overall configuration of raw turkey 10, product 70 is normally of substantially smaller size than raw turkey 10, insofar as the product 10 is substantially entirely composed of meat.

Each section 51, 52, 53 and 54, is formed with transverse 0-ring grooves 51b, 51c; 52b, 52c; 53b, 53c; and 54b and 54c, respectively for encompassing 0-ring 65 and abutting split 0-rings 66 and 67 so that when mold 50 is fully assembled as shown, the mold is in a water-tight condition for purposes hereinafter appearing.

Assembly of the mold proceeds with the sub-assemblies 52 and 54 (FIG. 3) and 51 and 53, with the respective 0-rings 66 and 67 sealed in the groove portions.

The dark meat portion 33 is first pressed into the lower and rearward portions of the sub-assemblies, particularly including the leg portions (FIG. 3). The dark meat is pressed in to remove air pockets and to assure a solid packing. It is noted that the mold split line is in line with the outermost end 69 of the leg to provide for ready mold separation without breaking the finished turkey product.

The exposed surfaces of the dark meat are at 61 and 62; 62 being the sub-assembly interface. The white meat portion 32 is then pressed into the mold sub-assemblies on top of the dark meat at surface 61. The white meat like the dark meat is pressed into a tight-packed form.

The two mold sub-assemblies are then pressed together with 0-ring 65 in place, and clamp 55 provide the final clamping to achieve the fully-packed mold as shown in FIGS. 2 and 4.

The filled mold is then transferred to a vat 81 wherein it is supported on a stand 82 and immersed in water 83 heated to about 160° to 165° F., for cooking. The cooking time is of course, dependent on the weight of the meat in the mold and the following Table I shows the weight cooking time relatively.

TABLE I

| Weight of meat (lbs.) | Time [1] (hrs.) |
|---|---|
| 25 | 4½ |
| 15 | 3½ |
| 10 | 2¾ |

[1] at 160° F. to 165° F.

After cooking the meat in the mold, the mold is removed from the vat 81 and allowed to cool to room temperature. Thereafter the mold is returned to the still heated vat for 2 minutes and then once again removed and cooled. This latter procedure permits ready release of the mold without vacuum pockets, and assures that the molded product is not broken when the mold is disassembled.

With disassembling, there is the cooked molded turkey product 90, ready to eat at this time or may be sent to packaging for subsequent consumption with or without reheating.

Product 90 has several novel features to it including the fact that it is without bones and free of skin covering. Product 90 may be cut into steak portions (e.g. 90a) of about ½ to 1½ inches for serving. Such steak portions may be cut entirely from the white meat section or entirely from the dark meat sections, or a combination of white and dark meat as shown as 90a. Each cut portion displays the cooked chunks or pieces 18a and 19a, corresponding to uncooked pieces 18 and 19 respectively. Pieces 18a and 19a are held together by the cooked paste materials 28a and 29a corresponding to 28 and 29, in a firm matrix. The steak 90a may be cut in a manner similar to a beef steak.

The bones 12 may be rendered into a gravy by conventional processing 89 and packaged in a container 88. Then gravy may be heated in conjunction with product steak 90a, to provide a steak and gravy combination.

Thus, the entire turkey is utilized in the preparation of the product to be consumed, and there is full usage of the raw material without waste.

Referring to FIGS. 5-7, there is shown a mold 100 which constitutes a second embodiment of the present invention. The mold of the second embodiment is similar to that of the first embodiment, except that it is considerably less complicated and produces a molded turkey product 102, which has substantially the same form as a molded turkey product 70 provided in the first embodiment. The mold 100 is of a generally rectilinear overall configuration and comprises two sections, namely, 104 and 106. Each mold section 104 and 106 is formed with a contoured internal surface 108 and 110, respectively (surface 108 cannot be seen in the drawings). Thus, when the sections are assembled, an internal surface is formed having a configuration of the whole cooked turkey. As in the first embodiment, although the molded turkey product 102 has the overall configuration of a raw turkey 10, the product 102 is normally of substantially smaller size than the raw turkey 10 since the product is substantially entirely composed of meat. Further, although the mold is contoured into the configuration of a turkey, it is within the scope of the present invention to form the hollow portion in any desired configuration, such as, for example, a chicken or a duck.

Each section 104 and 106 includes an access passage way 114. Each of the access passageways 114 are substantially semi-circular in cross-section and are located along the inner faces 116 and 118 of the mold sections 104 and 106 respectively. Also, each of the access passageways are substantially symmetrical so that when the sections 104 and 106 are joined together, a circular passageway including the access passage 114 is formed. Note that the access passage extends from the end of the contour surface so that the meat can easily be pressed into the internal surface formed when the two sections are joined together. Also, one end of each of the access passages 114, near an outer edge 120 of the mold 100, is threaded to receive an end plug 122 as will be further described. It should be noted that the section may be held together by any desired means such as, for example conventional spring tension clamps 124.

An important aspect of the second embodiment of the present invention is a provision of a highly flexible, extremely stretchable bag which may be made out of a material such as for example Visking. The bag 130 may be formed from a cylindrical tube which has a wire clip 132 of any desired configuration tied around one end of the bag. Before the bag is to be stretched, it may be preferable to wet the bag to enhance its ability to stretch. After the bag is filled within the mold, as will be further described, a second clip 134, as seen in FIG. 7 is tied around the open end of the bag to secure the meat therein. In order to more fully understand the second embodiment of the present invention, a description of the method of the filling of the mold follows:

A tubular bag 130 is closed at one end with a clip 132. Then the bag 130 is placed within the internal surface having the configuration of the whole cooked poultry which is formed by the assembly of the sectional members. After the bag is placed within the mold, the two sections are clamped together by the clamps 124. It should be noted that the open end of the bag 130 extends out of the access passage created by 114 beyond the end face 120 of the mold 100.

The mold is now prepared to be filled as follows: A stuffing tube 136 which may be a cylindrical hollow metal tube, is inserted within the open end of the plastic bag and extended into the interior of the mold. The front portion of the flexible bag is first filled with white meat indicated by 138. It may be desirable to place the mold 100 on an end face 140 during this filling process in order that the white meat will uniformly fill one end of the bag 130. After the desired amount of white meat 138 is in the bag, dark meat 142 is pressed into the remainder of the flexible bag against the white meat. During this process, it may be necessary to slowly withdraw the stuffing tube 136 as required. The dark meat is formed into the bag until the bag assumes the shape of the internal surface formed by 108 and 110. The dark meat 142 is added until it extends into the access passageway as seen in FIG. 7. Then, a clip 134 seals off the end of the bag and an end plug 122 may be plugged into the access passageway.

As in the first embodiment, the filled mold 100 is transferred to a vat 81 and cooked as described above. Since the meat is completely contained within a plastic bag, any expansion due to the cooking will only cause the meat to more completely take the form of the internal contour of the sectional members. After the meat has been cooked, the mold 100 is removed from the vat 81 and allowed to cool. Upon disassembling the mold, a cooked molded turkey product, already packaged, is ready for consumption, with or without reheating.

It can readily be realized that the mold 100 of the second embodiment is easy and convenient to use in that no sealing problems are encountered because the meat is all encased within the plastic bag. Also, it is very easy to stuff the meat within the bag. Further, sanitation problems are substantially eliminated, because the meat does not contact the surface of the mold itself.

It will thus be seen that there is disclosed a novel product and process for making the same and while the product and process have been described in rather specific detail, it will be understood that the method may be used for any type of fowl, and minor changes may be made without departing from the spirit of the invention as defined in the appended claims.

I claim:

1. A method of producing a cooked poultry product comprising:
   a. providing a flexible stretchable bag having a closed end and an open end and placing the closed end of the flexible stretchable bag within the internal contour of assembled and clamped sectional members of a mold, said internal contour forming a cavity the configuration of which is a whole cooked poultry product comprising a breast portion and leg portions the bag being positioned substantially within the cavity, said open end being disposed adjacent an access hole in the assembled mold;
   b. placing the mold on an end disposed away from the access hole and inserting a filling tube into said flexible bag through said access hole in the assembled mold and into the open end of the bag;
   c. pressing a first meat comprising a white meat through the filling tube at the open end of said bag so that the forced meat causes the bag to stretch so that a first portion of the bag contacts a first portion of the mold contour corresponding to and substantially filling the breast portion of the poultry;
   d. pressing a second meat comprising a dark meat through the filling tube at the open end of said bag, onto the first meat, so that a second portion of the bag contacts a second portion of the mold contour corresponding to and filling the leg portions;
   e. closing the open end of the bag after the bag is stretched to the mold contour; and
   f. then heating the mold so as to cook the meat within the bag confined to the internal mold contour, further comprising retaining the stretched and filled bag in the mold during heating so that the final form is set prior to opening the mold, and expansion of the meat in the bag due to cooking causes the meat to more completely take the form of the internal contour of the mold, whereby the cooked meat is in the form of a whole cooked poultry with the white meat in the breast portion and the dark meat in the leg portion.

2. The method of claim 1, where said leg portions of said mold contour comprising portions extending away from the body portion, so that in filling the bag with dark meat, the bag is stretched into the leg portion and filled only with dark meat.

3. The method of claim 2, further comprising wetting the bag portion prior to insertion in the mold to permit stretching of the bag to the mold contour including the leg portions thereof.

4. The method of claim 1, further comprising withdrawing the filling tube during filling of the dark meat portion.

5. The method of claim 4, further comprising filling the dark meat to a portion of the bag within the access hole before closing the open end of the bag.

6. The method of claim 5, further comprising plugging said access hole before cooking so as to retain the closed end within the mold to permit the complete expansion against the internal contour of the mold.

* * * * *